United States Patent

Nasu et al.

[15] 3,700,084
[45] Oct. 24, 1972

[54] FRICTION DISC CLUTCH FOR VEHICLES

[72] Inventors: Jiro Nasu, Nagoya; Tokuo Ogawa, Niwa-gun; Yoshio Sekine, Ama-gun, all of Japan

[73] Assignee: Toyota Jidosha Hanbai Kabushiki Kaisha, Aichi-ken, Japan

[22] Filed: July 13, 1971

[21] Appl. No.: 162,059

[30] Foreign Application Priority Data

July 13, 1970 Japan ......................45/69822
July 31, 1970 Japan ......................45/77011
Aug. 29, 1970 Japan ......................45/75717
Dec. 28, 1970 Japan ....................45/137524

[52] U.S. Cl. ............................192/70.28, 192/89 B
[51] Int. Cl. ...............................................F16d 13/50
[58] Field of Search ........192/70.28, 89 B, 98, 70.29; 188/72.3, 216

[56] References Cited

UNITED STATES PATENTS

| 994,141 | 6/1911 | Fletcher | 192/70.28 X |
|---|---|---|---|
| 1,324,501 | 12/1919 | Gerdeman | 192/70.28 X |
| 1,438,457 | 12/1922 | Morton | 192/70.28 X |
| 2,020,637 | 11/1935 | Fawick | 192/89 B X |
| 2,995,216 | 8/1961 | Jeffries | 188/72.3 |
| 3,499,512 | 3/1970 | Maurice | 192/89 B |

FOREIGN PATENTS OR APPLICATIONS

570,236 1/1924 France....................192/70.29

Primary Examiner—Allan D. Herrmann
Attorney—Berman, Davidson & Berman

[57] ABSTRACT

A friction disc clutch of the type which includes an output shaft, a flywheel secured to a drive shaft, a clutch cover connected to the flywheel, a pressure plate mounted movably in the clutch cover, a dish spring supported by the clutch cover and the pressure plate, and a clutch disc mounted slidably on the output shaft and positioned between the flywheel and the pressure plate. Means for causing additional thrusting force to disengage the clutch disc forcefully from the flywheel in disengaging operation of the clutch is provided between an inner race of a guide bearing receiving the top end of the output shaft and the clutch disc, thereby to expedite disengaging operation.

25 Claims, 22 Drawing Figures

JIRO NASU,
TOKUO OGAWA,
YOSHIO SEKINE,
INVENTORS.

BY
Berman, Davidson & Berman, ATTORNEYS.

ions of the engine transmitted through the drive shaft is used to leave the clutch disc off from the flywheel in the clutch disengaging operation. In this way, because of insufficient sliding action of the clutch disc against the output shaft, the clutch disc cannot leave off sufficiently and quickly from the flywheel. This causes undesired friction to remain within the clutch assembly. Lubrication oil is employed on the engaging portion of the clutch disc with the spline portion of the output shaft to reduce sliding resistance, through which no satisfactory result is obtained.

SUMMARY OF THE INVENTION

It is, therefore, an object of the present invention to provide a friction disc clutch in which declutching operation is boosted by additional thrusting force to disengage the clutch disc facing forcefully from the flywheel of the clutch.

It is another object of the present invention to provide a friction disc clutch having the above-mentioned characteristics, wherein abrasion of the clutch disc facing caused by dull declutching operation is eliminated whereby a longer durability of the clutch is obtainable.

It is still another object of the present invention to provide a friction disc clutch having the above-mentioned characteristics, wherein the means for eliminating dull disengaging operation of the clutch can automatically be adjusted to compensate for the abrasion of the disc facing.

It is yet another object of the present invention to provide a friction disc clutch having the above-mentioned characteristics, wherein means for preventing dull declutching operation is of simple construction and which is adaptable to the conventional clutches without any additional complicated works.

According to one preferred embodiment of the present invention, there is provided a friction disc clutch having additionally resilient means or the like for generating additional thrusting force to disengage the clutch disc facing forcefully from the flywheel of the clutch so as to expedite declutching operation, the resilient means being positioned between the inner race of a guide bearing receiving the top end of an output shaft and a clutch disc mounted axially slidably on the output shaft.

BRIEF DESCRIPTION OF THE DRAWINGS

Various other objects, features and attendant advantages of the present invention will be more fully appreciated as the same becomes better understood from the following detailed description, especially when considered in conjunction with the accompanying drawings, in which like reference numerals designate like or corresponding parts through out all the views, and wherein.

DESCRIPTION OF THE PREFERRED EMBODIMENTS

Figures 1, 2:
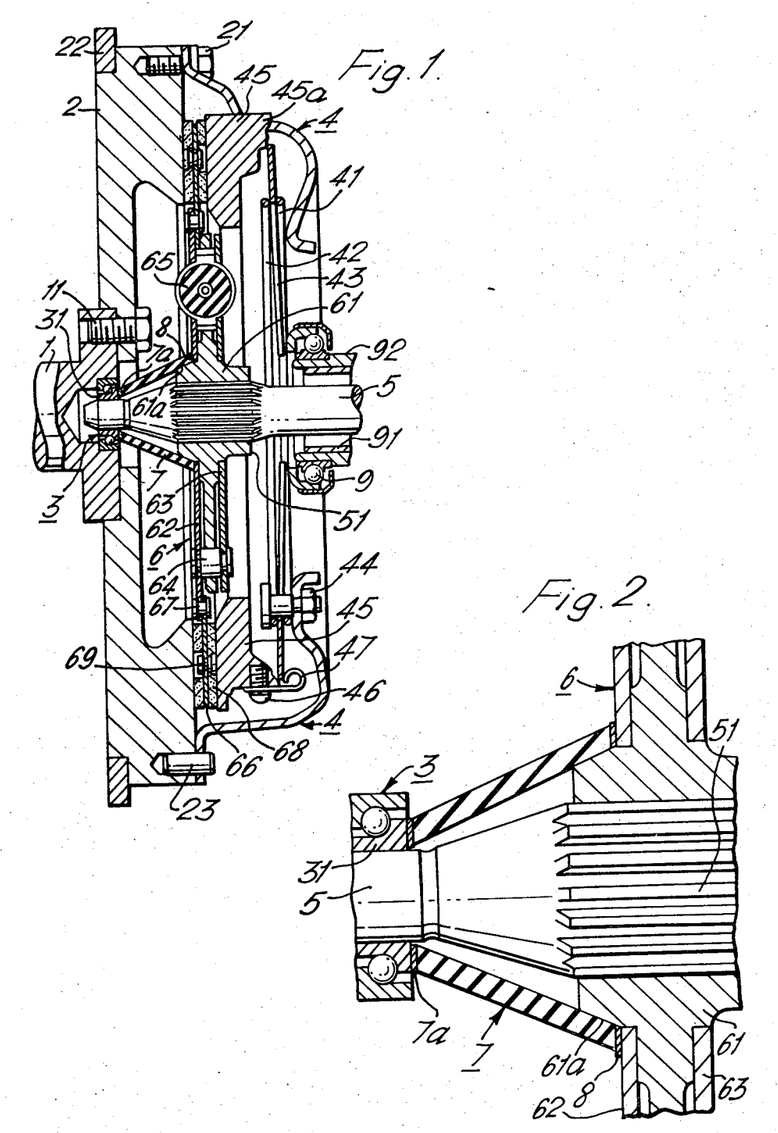
FIG. 1 shows a full sectional view of a preferred embodiment of the present invention.
FIG. 2 is an enlarged sectional view of the inventive construction of the embodiment shown in FIG. 1.

Now referring to the drawings, there is shown a preferred embodiment of the present invention in FIG. 1, wherein a flywheel 2 is secured by bolts 11 on a drive shaft 1 driven by an engine (not shown) of the vehicle. A cover plate 4 is firmly fixed by bolts 21 on the annular outer circumference of the flywheel 2. The cover plate 4 is formed approximately in an annular shape. Firmly held by bolts 44 on the inner circumferential end portion of the cover plate 4 is the inner circumference of an annular dish spring 43 which is sandwiched and held by a pair of wire springs 41 and 42. The outer edge of the dish spring 43 is fixedly urged onto the outer circumference of a pressure plate 45 by means of retracting springs 47 secured on the outer circumference of the pressure plate 45 by screws 46.

An approximate annular shape is adopted for the pressure plate 45 which is provided with an axially jutting boss 45a on the circumferential edge thereof. The pressure plate 45 is installed on the cover plate 4 in a way to be axially slidable toward and against the flywheel 2. Resilient force of the dish spring 43 normally biases the pressure plate 45 toward the flywheel 2.

The top end portion of an output shaft 5 is rotatably journalled by the end portion of the drive shaft 1 through a guide bearing 3. The output shaft 5 is provided with a spline portion 51 thereon with which a clutch hub 61 of a clutch disc 6 is axially slidably engaged. The clutch disc 6 comprises a disc plate 62 and a sub plate 63 positioned respectively on the both circumferential sides of the clutch hub 61, a resilient member 65 interposed between the disc plate 62 and the sub plate 63 and rivets 64 holding the plates 62 and 63 in the positions therefor. A disc spring 66 is positioned and fixed by rivets 67 on the outer circumferential face of the disc plate 62. Then, to complete the clutch disc 6, a pair of clutch facings 68 is secured by rivets 69 respectively on the both sides of the disc spring 66. The clutch disc 6 is thus pressed between the flywheel 2 and the pressure plate 45 by the resilient force of the dish spring 43 to transmit torque from the drive shaft 1 to the output shaft 5.

FIG. 2 depicts in a larger scale the most important portion in which the present invention is characterized. Employed therein is a resilient member 7 of a circular truncated cone cylinder interposed between an inner face of the disc plate 62 and a side face of an inner race 31 of the guide bearing 3. The resilient member 7 is made of such elastic materials as rubber or like materials. A metal plate 7a is baked on the annular edge of the small diameter opening of the resilient member 7, the small diameter opening edge being in contact with the inner race 31 of the guide bearing 3. An adjusting annular shim 8 is interposed between the large opening edge of the resilient member 7 and the disc plate 62. This adjusting shim 8 is employed so to have the resilient member 7 installed properly and precisely to the position therefor inbetween the inner race 31 of the guide bearing 3 and the disc plate 62, the resilient member 7 being thus adjustable to the distance differences between the inner race 31 of the guide bearing 3 and the disc plate 62 of the clutch disc 6. The resilient member 7 is set up so that there will be no resilient force thereof nor any axial open space when the clutch is disengaged, that is, when the clutch facing 68 is kept apart from the flywheel 2 by a predetermined distance.

Now referring back to FIG. 1, a release bearing 9 makes sliding movements together with a release bearing hub 92 on a guide sleeve 91 in correspondence with operation of the clutch pedal (not shown) of the vehicle. Reference numeral 22 shows a ring gear imbedded in the outer circumference of the flywheel 2 and reference numeral 23 depicts a positioning pin pre-imbedded in the flywheel 2 to have the cover plate 4 in the proper position therefor.

Referring now to the operation of the preferred embodiment of the present invention, FIGS. 1 and 2 illustrate the clutch in its full engagement, wherein the resilient force of the dish spring 43 urges the clutch disc 6 hard onto the flywheel 2 through the pressure plate 45.

Actuation on or depression stroke of the clutch pedal (not shown) for declutching operation slides the release bearing 9 and the release bearing hub 92 in a piece on the guide sleeve 91 toward the flywheel 2 or leftward in the figure. This causes tilting movement of the dish spring 43 with fulcrums of the wire springs 42 and 43 to move through the retracting springs 47 the pressure plate 45 apart from the flywheel 2 or rightward in the figure by a predetermined distance. In this operation, The resilient thrust of the resilient member 7 forces the clutch disc 6 to move rightward on the spline portion 51 of the output shaft 5. The clutch facing 68 is moved away from the side face of the flywheel 2 a predetermined distance and positioned approximately inbetween the flywheel 2 and the pressure plate 45. Consequently, the torque from the output shaft 1 is disconnected. At this moment, as the resilient member 7 has been adjusted by the adjusting shim 8 to become of the predetermined length fitting in the distance between the inner race 31 of the guide bearing 3 and the disc plate 62, the resilient force of the resilient member 7 becomes approximately zero, the resilient member 7 being held at the point where the resilient thrust thereof is balanced up against the sliding resistance between the clutch hub 61 and the spline portion 51 of the output shaft 5. This makes the longitudinal open space zero.

In the mentioned status, the clutch facing 68 of the clutch disc 6 is kept completely out of contact with the flywheel 2 and the pressure plate 45 to shut off torque transmission entirely.

When the actuation on the clutch pedal is eliminated to have the clutch engaged, the release bearing 9 and the release bearing hub 92 in a piece move rightward in the figure on the guide sleeve 91 and the urging force of the release bearing 9 is removed off from the dish spring 43. The resilient force of the dish spring 43 urges the pressure plate 45 toward the flywheel 2 to press finally the clutch disc 6 hard onto the flywheel 2. Frictional force respectively between the pressure plate 45, the flywheel 2 and the clutch facing 68 starts the clutch disc 6 to rotate. The rotation force is cushioned by the resilient member 65 and smoothly transmitted to rotate the clutch disc 6, the resilient member 7, the inner race 31 of the guide bearing 3 and the output shaft 5 all in a piece. The resilient member 7 is compressed in accordance with the displacement of the clutch disc 6 toward the flywheel 2 by the urging force of the pressure plate 45. And when the clutch disc 6 is fully urged onto the flywheel 2, the resilient member 7 is accordingly compressed by the predetermined distance and charged with thrusting force preset as already described. The metal plate 7a prevents the resilient member 7 from interfering with the outer race of the guide bearing 3 when the resilient member 7 is compressed and deformed.

It should be well noted that in the mentioned embodiment, rapid and clear-cut disengagement of the clutch can be accurately obtained. And, in case of abrasion of the clutch facing 68, a proper selection of the materials for the resilient member 7 compensates the abrasion by means of deformation of the resilient member 7 thereof.

The present invention is applicable in many modified ways as mentioned in the following preferred embodiments in which same and similar reference numerals are used to indicate the same and similar parts. And in any of the following embodiments, the major construction and operation are same as those of the first embodiment aforementioned. Thus, the explanation of the construction of the clutch assembly is eliminated as well as the operation to avoid unnecessary repeatation.

Figure 3:
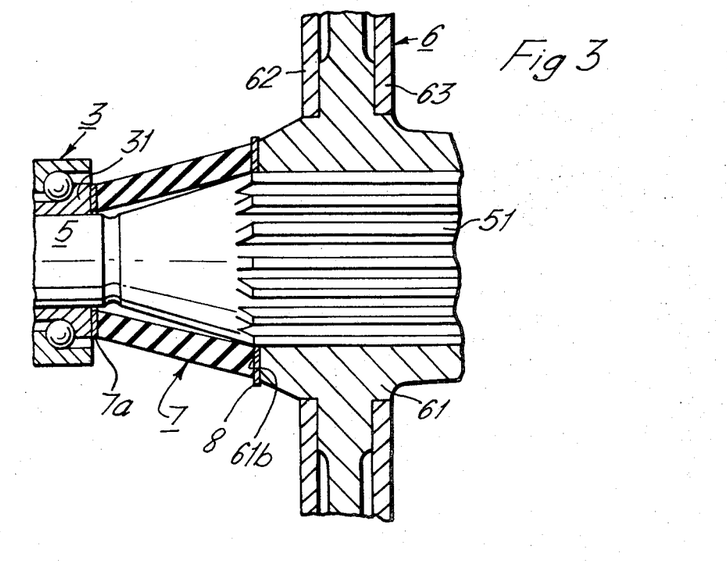
FIG. 3 is an enlarged sectional view of the inventive construction of a modified embodiment of the present invention.

Now reference is made to FIG. 3 for a second embodiment of the present invention. The resilient member 7 is installed between the inner race 31 of the guide bearing 3 and one side 61b of the clutch hub 61 through the adjusting shim 8. There occurs no different effect in the second embodiment from the first embodiment.

Figure 4:
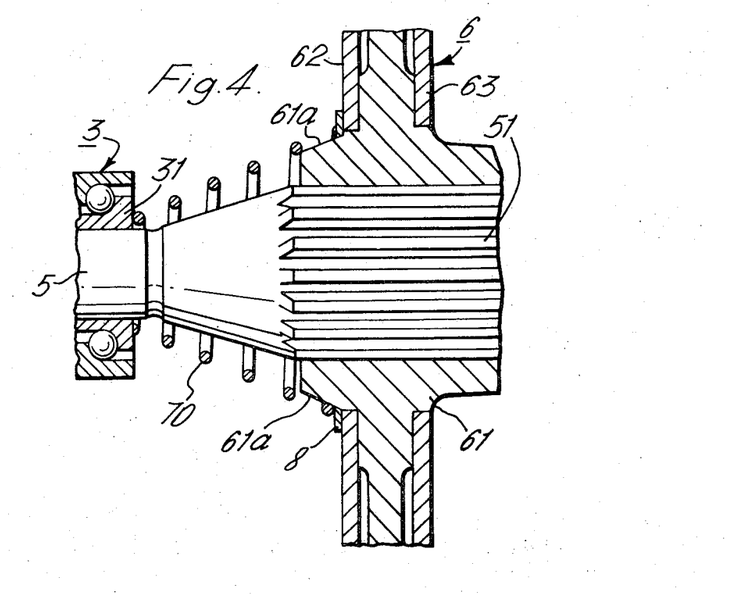
FIG. 4 illustrates an enlarged sectional view of the inventive construction of still a modified embodiment of the present invention.
Figure 5:
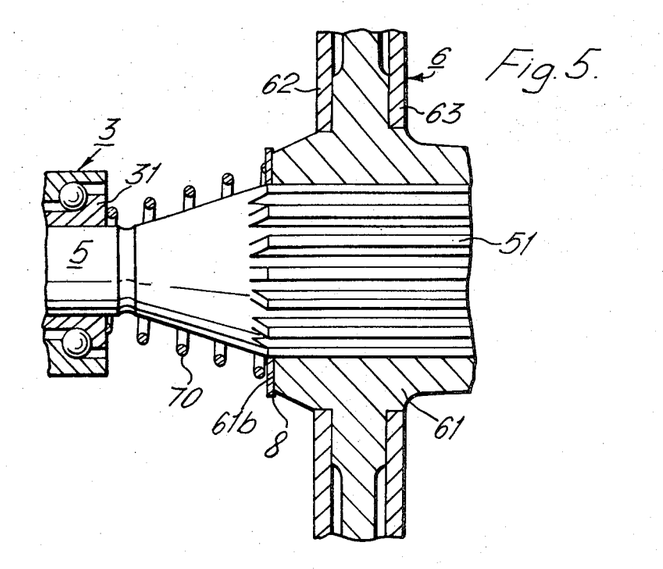
FIG. 5 depict an enlarged sectional view of the inventive construction of another modified embodiment of the present invention.

FIGS. 4 and 5 illustrate a third and a fourth embodiments, wherein a spiral spring 70 replaces the resilient member 7 respectively of the first and the second embodiments with the effects remaining unchanged.

Figure 6:
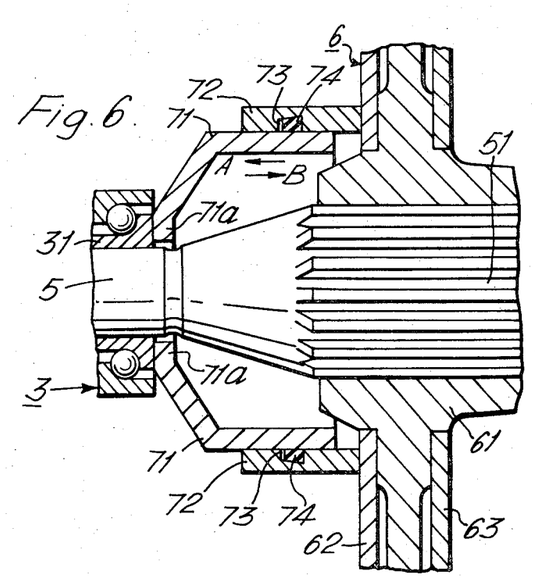
FIG. 6 is an enlarged sectional view of the inventive construction of another embodiment of the present invention.

FIG. 6 indicates a fifth embodiment, wherein the resilient member 7 of the first embodiment is replaced with a device comprising two cylindrical members 71 and 72 and an annular resilient member 74 provided with an oblong cross-section and made of rubber or rubber like materials. The cylindrical members 71 and 72 are positioned inbetween the inner face of the disc plate 62 and the side face of the inner race 31 of the guide bearing 3 and engaged axially to each other to have relative sliding movements. A seat portion 71a provided on the top end portion of the cylindrical member 71 gets in contact with the side face of the inner race 31 of the guide bearing 3 and the base end of the cylindrical member 72 is in contact with the inner face of the disc plate 62. As well seen in the figure, the top portion of the output shaft 5 runs through the small diameter annular opening of the cylindrical member 71 and engages with the guide bearing 3. The resilient member 74 is placed within an annular groove 73 provided on the inner circumferential wall of the cylindrical member 72 at the engaging portion with the cylindrical member 71. Thus, the resilient member 74 causes desired sliding resistance against the outer circumferential wall of the cylindrical member 71. As well illustrated in FIGS. 7 and 8, the groove 73 has two perpendicular walls 73a and 73b against the axis of the groove 73 and a slant friction side 73a in the direction of the axis of the groove 73.

While the clutch is conditioned to its engagement, the disc plate 62 of the clutch disc 6 urges the cylindrical member 72 leftward in FIG. 6. This compresses the resilient member 74 to be resiliently deformed, and the resilient member 74 produces a predetermined open space indicated by L in FIG. 8.

Figure 7:
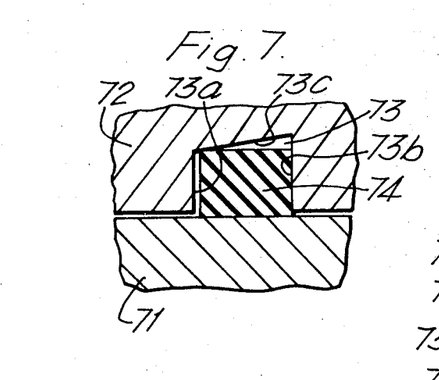
FIGS. 7 and 8 show enlarged cross-sectional views showing operations of the inventive effects of the embodiment shown in FIG. 6.

In disengaging the clutch, the tilting movement of the dish spring 43 releases finally the resilient member 74 by way of the pertaining construction parts as described in the first embodiment. The resilient force of the resilient member 74 causes it to return to the original shape as shown in FIG. 7 and the cylindrical member 72 back along the cylindrical member 71 by the distance shown at L in FIG. 8. The clutch disc 6 is forcefully urged rightward by the base end of the cylindrical member 72 to leave consequently the clutch facing 68 off from the flywheel 2 by the predetermined distance of L. Thus, the clutch is disengaged through the already described process.

Figure 8:
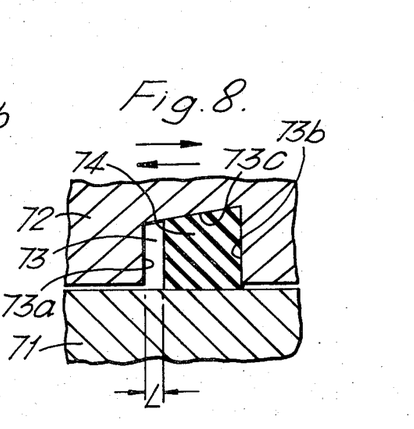

In engaging the clutch, the displacement of the clutch disc 6 toward the flywheel 2 by the urging force of the pressure plate 45 slides the cylindrical member 72 leftward on the outer circumference of the cylindrical member 71 by the predetermined L distance. During the sliding movement of the cylindrical member 72, the resilient member 74 within the grove 73 is compressed as shown in FIG. 8 since the side of the resilient member 74 in contact with the cylindrical member 71 makes no sliding movement due to the sliding resistance against the cylindrical member 71.

Thus rapid and clear-cut disengaging operation of the clutch can easily be secured. And in case the clutch facing 68 is abraded, the clutch disc 6 moves leftward in clutch engaging operation, by the corresponding distance of the abrasion in addition to the predetermined L distance. Although the resilient member 74 cannot be resiliently deformed more than the L distance, it makes an additional leftward displacement with the cylindrical member 72 on the cylindrical member 71 overcoming the sliding resistance between the resilient member 74 and the cylindrical member 71.

In the disengaging operation of the clutch, the cylindrical member 72 is urged back by the L distance by way of the deformed resilient member 74. In this operation, the cylindrical member 72 does not move back the forward distance caused by the abrasion because of the sliding resistance between the resilient member 74 and the cylindrical member 71. This fact shows that the engaging position of the cylindrical member 72 with the cylindrical member 71 is displaced by a distance in correspondence with the abrasion, thereby compensation is obtained for the abrasion of the clutch facing 68.

Figure 9:
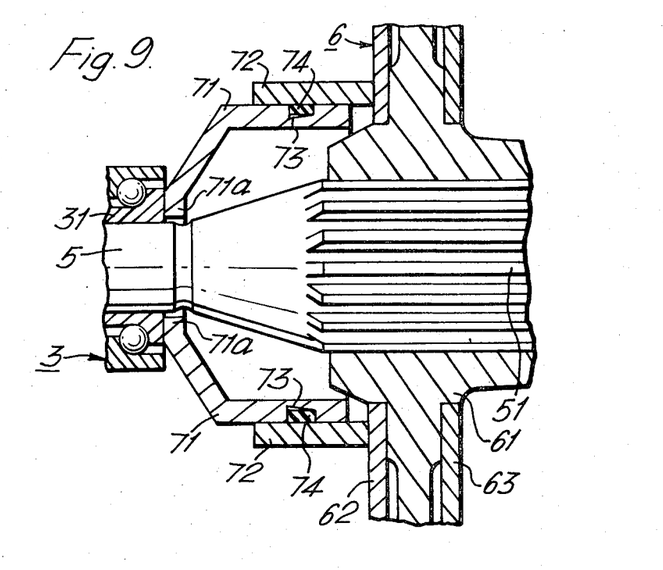
FIGS. 9 through 15 show enlarged sectional views of the inventive construction of modified embodiments from the one shown in FIG. 6.

A sixth embodiment of the present invention is illustrated in FIG. (, wherein an annular resilient member 74 of the fifth embodiment is now installed in the annular groove 73 provided on the outer circumferential wall of the cylindrical member 71 to have the same resilient effects as in the fifth embodiment.

Figure 10:
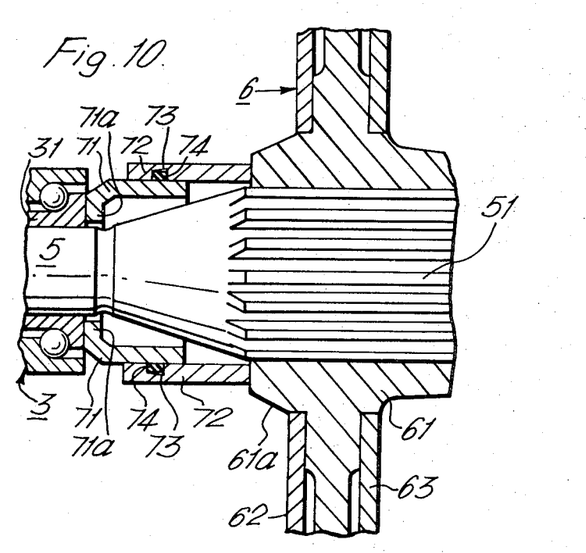

In a seventh embodiment of the present invention as referred to FIG. 10, the base end of the cylindrical member 72 is positioned to be in contact with the end face 61a of the clutch hub 61. Yet, the same resilient effects as in the case of the fifth and sixth embodiments are well expected.

Figure 11:
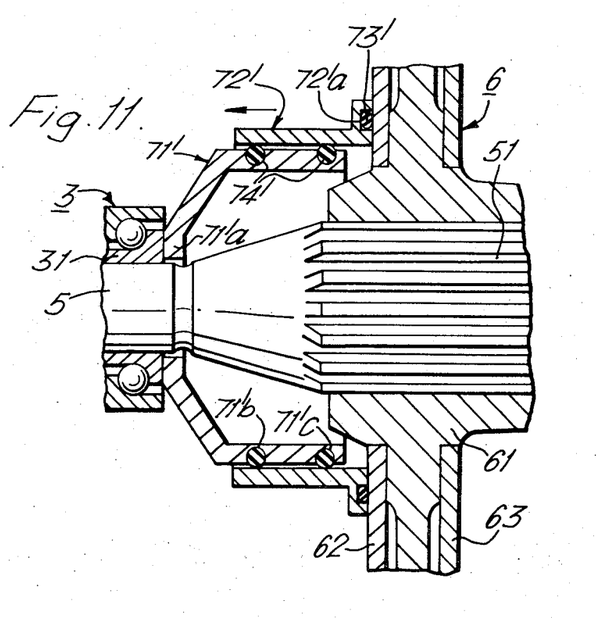
Figure 12:
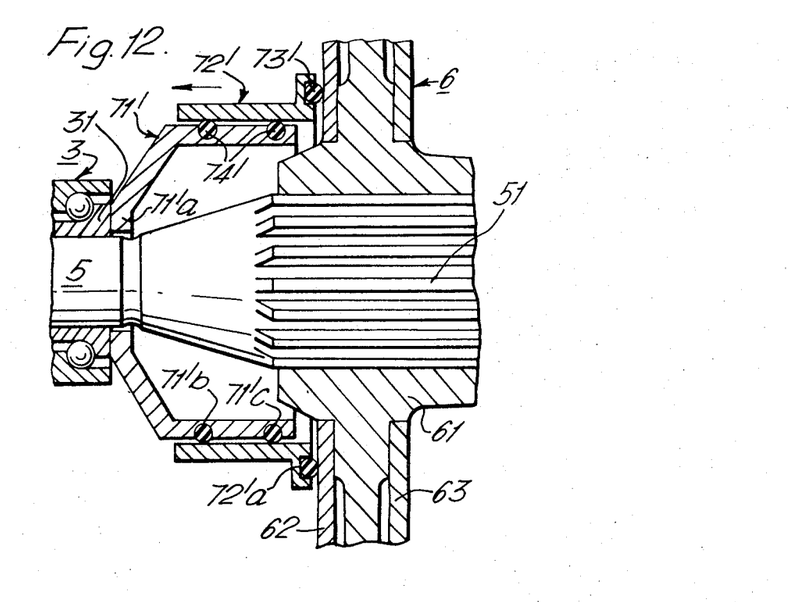

An eighth embodiment of the present invention is referred to FIGS. 11 and 12 wherein cylindrical members 71' and 72' replace the cylindrical members 71 and 72 in the precedding fifth, sixth and seventh embodiments. The cylindrical members 71' and 72' are installed in the same position and manner as in the fifth embodiment. In this preferred embodiment, however, the cylindrical members 71' and 72' are characterized in that the latter, members 72', gets in contact with the inner face of the disc plate 62 through an annular resilient member 73' with a circular cross-section, the resilient member 73' being placed in an annular groove 72a' drilled on the end face of the base portion of the cylindrical member 72', with the member 71' being provided with two annular grooves 71'b and 71'c formed on the outer circumferential wall thereof. Annular resilient members 74', 74' with a circular cross-section are respectively placed within the grooves 71'b and 71'c so as to produce sliding resistance between the cylindrical members 71' and 72' as the resilient members 74', 74' are pressed from both directions by the cylindrical members 71' and 72'. The resilient member 73' is resiliently deformed to a predetermined degree when urged by the disc plate 62 of the clutch disc 6 to charge therein return urging force. The return urging force of the resilient member 73' is preset to be larger than the sliding resistance between the clutch hub 61 and the spline portion 51 of the output shaft 5. And yet, the return urging force of the resilient member 73' when fully compressed is preset to be smaller than the sliding resistance produced by the resilient members 74', 74'.

While the clutch is engaged, as seen in FIG. 11, the resilient member 73' is conditioned to its fully compressed status by the disc plate 62 of the clutch disc 6. And in the clutch disengaging operation (see FIG. 12), the tilting movement of the dish spring 43 releases finally the resilient member 73' by way of the pertaining construction parts in the process already described. So that the return urging force of the resilient member 73' works to move the disc plate 62 rightward by a predetermined distance to leave consequently the clutch facing 68 off from the flywheel 2. And the clutch is conditioned quickly to its full disengagement position.

In the engaging operation of the clutch, the movement of the disc plate 62 toward the flywheel 2 in the already described process compresses the resilient member 73' by the predetermined distance. And while the clutch is conditioned to the full engagement thereof, the base end face of the cylindrical member 72' is slightly in contact with the disc plate 62.

Again in this preferred embodiment, rapid and clear cut disengagements of the clutch can be realized. And the abrasion of the clutch facing 68 i easily its automatically compensated in the following steps. In clutch engaging operation, the disc plate 62 urges the base end face of the cylindrical member 72' additionally by the distance corresponding with the abrasion. This additional urging force overcomes the sliding resistance of the resilient members 74', 74' to displace the cylindrical member 72' toward the flywheel 2 or to the direction shown with an arrow in FIG. 11. Then, in the clutch disengaging operation, the sliding resistance of the resilient members 74', 74' holds the cylindrical member 72' in the displaced position which is equal to the abrasion and the clutch disc 62 is moved by the return thrust of the resilent member 73' by the predetermined distance.

Figure 13:
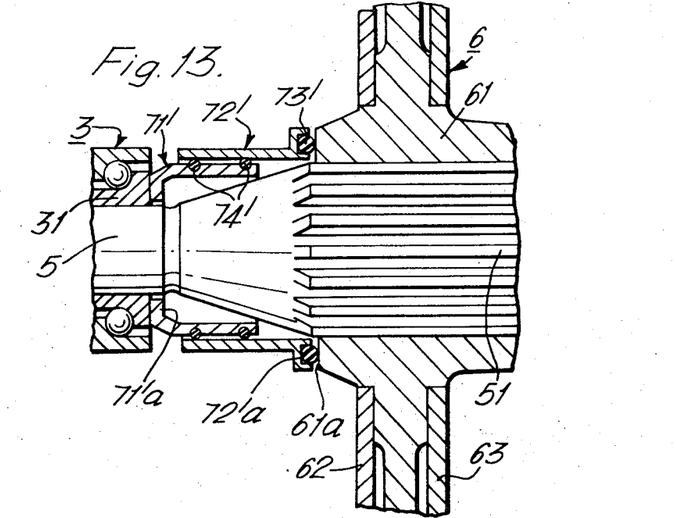

In a ninth embodiment shown in FIG. 13, the base end of the cylindrical member 72' is in contact with the side face 61a of the clutch hub 61 through the resilient member 73'.

Figures 14, 15, 16:
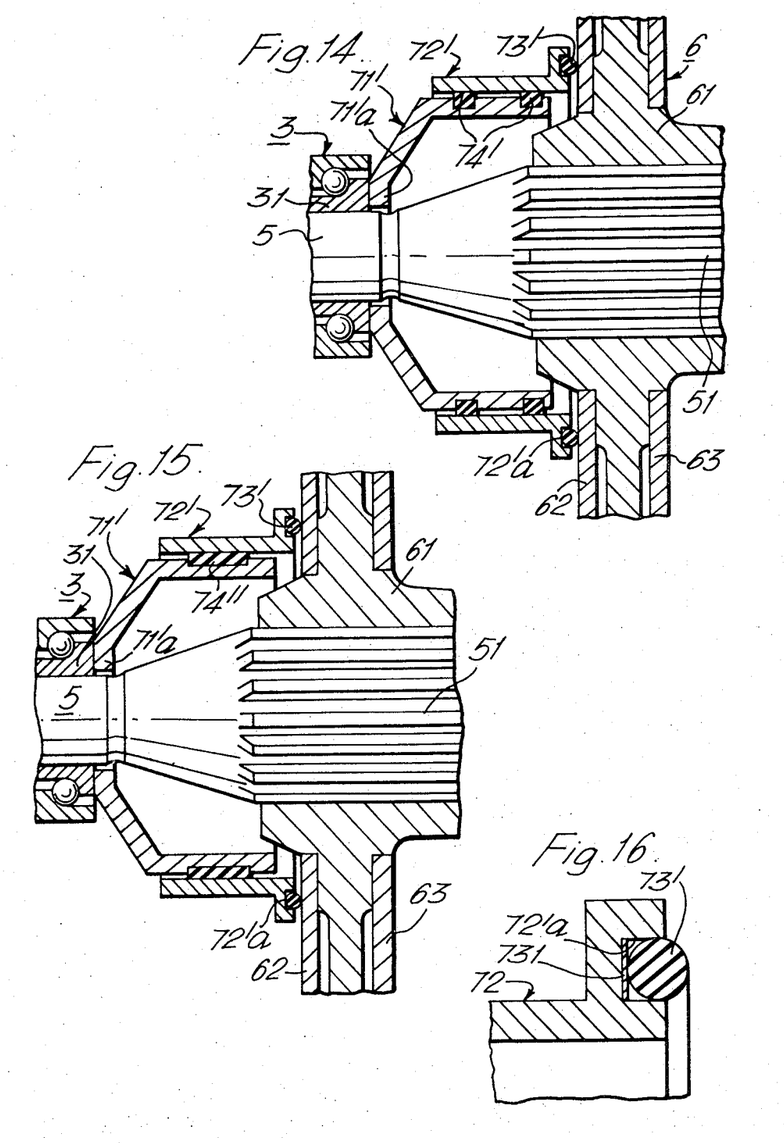
FIGS. 16 through 22 show various modified forms of a resilient member suitably adoptable to the inventive constructions of the modified embodiments shown in FIG. 11 through 15.
Figure 17:
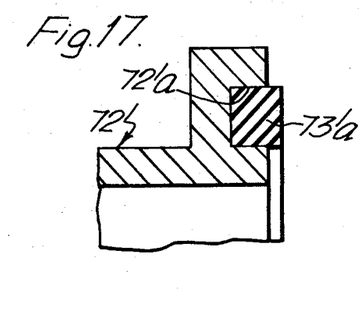
Figure 18:
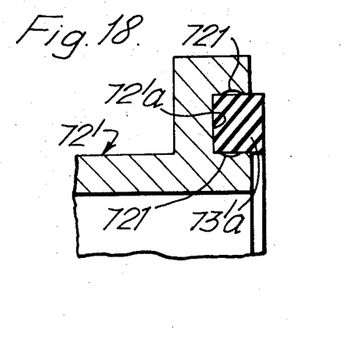
Figure 19:
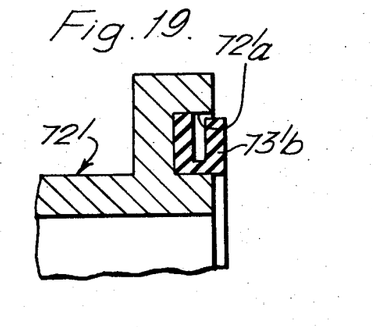
Figure 20:
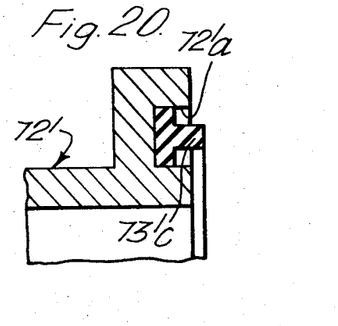
Figure 21:
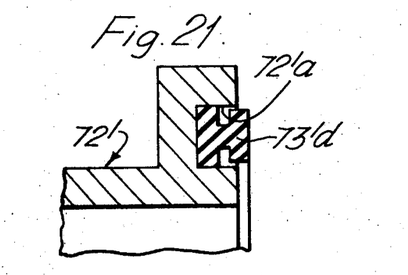
Figure 22:
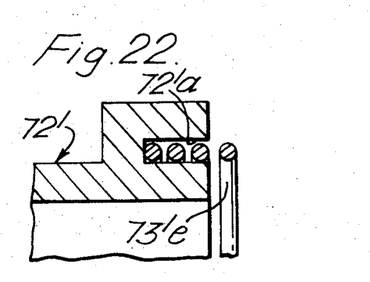

Many modifications are possible covering the aforementioned eighth and ninth embodiments; in which, the resilient members 74', 74' can be replaced with those having square cross-sections (see FIG. 14), or with one resilient member 74" having an oblong cross-section (see FIG. 15); the resilient member 73' may be installed in the groove 72'a through an annular adjusting shim 731 to compensate for any possible mismeasuring on the sizes of the resilient member 73' in manufacturing processed (see FIG. 16); and the resilient member 73' can be replaced with another one, 73'a having a square cross-section (see FIGS. 17 and 18), with still another one, 73'b having an U-shaped letter cross-section (see FIG. 19), with one, 73'c having a T-shaped letter cross-section (see FIG. 20), with one, 73'd having an H-shaped letter cross-section (see FIG. 21), or with a coil spring 73'e (see FIG. 22).

In the employment of the resilient member 73'a with a square cross-section (FIGS. 17 and 18), indentations 271, 271 on the inner walls of the groove 72'a (see FIG. 18) provide relief cavities for the resilient member 73'a when deformed so as to prevent any changes in the return thrust of the resilient member 73'a. And in the employment of other modifications shown in FIGS. 19 through 22, the deformation relief is provided by the resilient members 73'b — e themselves.

As well described in the aforementioned preferred embodiments, in all the cases, the present invention provides accurate and clear-cut clutch disengaging operation and automatic compensation of the abrasion of the clutch facing. This provides a longer durability of the clutch and further features are that the device is of a very simple construction and can easily be installed in a clutch assembly already in use without any additional complicated works.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A friction disc clutch for motor vehicles of the type which includes a flywheel secured to an engine drive shaft and having a peripheral annular flange, an annular inner edged clutch cover connected to the free end face of said flange, a pressure plate with an annular circumferential edge mounted movably in said clutch cover, an annular dish spring supported at the outer and inner circumferences thereof respectively by said annular circumferential edge of said pressure plate and the annular inner edge of said clutch cover, and a clutch disc mounted displaceably on an output shaft and positioned between said flywheel and said pressure plate, said clutch disc providing frictional driving engagement between said drive shaft and said output shaft when pressed between said flywheel and said pressure plate by means of the resilient force of said dish spring, wherein the improvement comprises a guide bearing assembly mounted on said drive shaft adjacent the end of the output shaft and having an inner race receiving said end of the output shaft, and torque-transmitting resilient means positioned between said inner race and said clutch disc, said resilient means being normally prestressed by said dish spring and having a release strength to generate thrusting force sufficient to cause said clutch disc to disengage from said flywheel, said thrusting force having a predetermined value less than said resilient force of the dish spring in clutching operation.

2. A friction disc clutch for motor vehicles as set forth in claim 1, wherein the clutch disc includes a clutch plate and said resilient means is positioned between a side face of the inner race of said guide bearing and the adjacent face of the clutch plate of said clutch disc.

3. A friction disc clutch for motor vehicles as set forth in claim 1, wherein the clutch disc has a central hub and said resilient means is positioned between a side face of the inner race of said guide bearing and the adjacent side face of the central hub of said clutch disc.

4. A friction disc clutch for motor vehicles as set forth in claim 1, wherein said resilient means is an annular truncated cone-shaped member made of rubber-like material, the small diameter annular edge portion of said member being in contact with the inner race of said guide bearing and the large diameter annular edge portion of said member being normally in contact with said clutch disc.

5. A friction disc clutch for motor vehicles as set forth in claim 4, and an annular metal plate fixedly secured on the small diameter annular edge portion of said member.

6. A friction disc clutch for motor vehicles as set forth in claim 4, and an annular adjusting shim interposed between the large diameter annular edge portion of said member and said clutch disc.

7. A friction disc clutch for motor vehicles as set forth in claim 1, wherein said resilient means is a tapered coil spring.

8. A friction disc clutch for motor vehicles as set forth in claim 7, and an annular adjusting shim interposed between the large diameter edge portion of said spring and said clutch disc.

9. In a friction disc clutch for motor vehicles of the type which includes a flywheel secured to an engine drive shaft and having a peripheral annular flange, and annular inner edged clutch cover connected to the free end face of said flange, a pressure plate with an annular circumferential edge mounted movably in said clutch cover, an annular dish spring supported at the outer and inner circumferences thereof respectively by said annular circumferential edge of said pressure plate and the annular inner edge of said clutch cover, and a clutch disc mounted displaceably on an output shaft and positioned between said flywheel and said pressure plate, said clutch disc providing frictional driving engagement between said drive shaft and said output shaft when pressed between said fly wheel and said pressure plate by means of the resilient force of said dish spring, the improvement comprising a guide bearing assembly mounted on the end of said drive shaft adjacent the end of the output shaft and having an inner race receiving said end of the output shaft, first and second substantially cylindrical members telescopically engaged with each other and positioned between said inner race and said clutch disc, means providing relative elastic sliding movement between said members and developing release thrusting force sufficient to disengage said clutch disc from said flywheel, said thrusting force having a predetermined value less than said resilient force of the dish spring in clutching operation.

10. A friction disc clutch for motor vehicles as set forth in claim 9, wherein the clutch disc includes a clutch plate and wherein an end of one of said cylindrical members is in contact with a side face of the inner race of said guide bearing and the opposite end of the other cylindrical member is in contact with the inner face of said clutch plate of the clutch disc.

11. A friction disc clutch for motor vehicles as set forth in claim 9, wherein the clutch disc has a central hub and wherein an end of one of said cylindrical members is in contact with a side face of the inner race of said guide bearing and the opposite end of the other cylindrical member is normally in contact with one side face of said hub of the clutch disc.

12. A friction disc clutch for motor vehicles as set forth in claim 9, wherein said first cylindrical member has an annular groove formed therein and has an annular resilient member within said groove, said resilient member engaging the circumference of said second cylindrical member whereby to produce said release thrusting force for disengaging said clutch disc from said flywheel when said cylindrical members are telescoped toward each other in clutching operation.

13. A friction disc clutch for motor vehicles as set forth in claim 9, wherein said second cylindrical member has an annular groove formed therein and has an annular resilient member within said groove, said resilient member being in contact with the inner circumferential portion of said first cylindrical member whereby to produce said release thrusting force for disengaging said clutch disc from said flywheel when said cylindrical members are telescoped toward each other in clutching operation.

14. A friction disc clutch for motor vehicles as set forth in claim 12, wherein said annular resilient member has a square cross-section and one side of said groove is tapered, whereby to deform said resilient member for generating said release thrusting force to disengage said clutch disc from said flywheel in clutching operation, said thrusting force being predetermined to be smaller than said resilient force of said dish spring.

15. A friction disc clutch for motor vehicles as set forth in claim 12, wherein said annular resilient member has an oblong cross-section.

16. A friction disc clutch for motor vehicles as set forth in claim 12, wherein said annular resilient member has a circular cross-section.

17. A friction disc clutch for motor vehicles as set forth in claim 9, wherein one of said cylindrical members is provided with an annular groove on the end thereof adjacent the clutch disc, and a resilient member positioned within said groove and being in contact with said clutch disc.

18. A friction disc clutch for motor vehicles as set forth in claim 17, and an annular shim provided within said groove, whereby to compensate for any mismeasurements in fabrication.

19. A friction disc clutch for motor vehicles as set forth in claim 17, wherein said resilient member has a square cross-section.

20. A friction disc clutch for motor vehicles as set forth in claim 19, wherein annular indentations are provided on the inner sidewalls of said groove, whereby to compensate for any undesired deformation of said resilient member.

21. A friction disc clutch for motor vehicles as set forth in claim 17, wherein said resilient member has a circular cross-section.

22. A friction disc clutch for motor vehicles as set forth in claim 17, wherein said resilient member has a U-shaped cross-section, whereby to compensate for any deformation of said resilient member.

23. A friction disc clutch for motor vehicles as set forth in claim 17, wherein said resilient member has an H-shaped cross-section, whereby to compensate for any deformation of said resilient member.

24. A friction disc clutch for motor vehicles as set forth in claim 17, wherein said resilient member has a T-shaped cross-section, whereby to compensate for any deformation of said resilient member.

25. A friction disc clutch for motor vehicles as set forth in claim 17, wherein said resilient member is a coil spring.

* * * * *